United States Patent
Shinde et al.

(10) Patent No.: US 8,293,330 B2
(45) Date of Patent: Oct. 23, 2012

(54) LENS COATING APPARATUS AND LENS COATING METHOD

(75) Inventors: Kenichi Shinde, Tokyo (JP); Katsuaki Uchida, Tokyo (JP); Tomohiro Ogawa, Saitama (JP); Tetsuhisa Nakamura, Tainan (TW); Hideki Hasegawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 1128 days.

(21) Appl. No.: 12/086,826

(22) PCT Filed: Dec. 22, 2006

(86) PCT No.: PCT/JP2006/325579
§ 371 (c)(1),
(2), (4) Date: Jul. 10, 2008

(87) PCT Pub. No.: WO2007/072940
PCT Pub. Date: Jun. 28, 2007

(65) Prior Publication Data
US 2009/0029061 A1    Jan. 29, 2009

(30) Foreign Application Priority Data
Dec. 22, 2005    (JP) .................................. 2005-369577

(51) Int. Cl.
    *B05D 3/00*    (2006.01)
(52) U.S. Cl. ........................ 427/294; 427/164; 427/508

(58) Field of Classification Search .................. 427/164, 427/294, 508
See application file for complete search history.

(56) References Cited

U.S. PATENT DOCUMENTS

| | | | |
|---|---|---|---|
| 5,201,560 A * | 4/1993 | Golden | 294/64.2 |
| 5,820,673 A * | 10/1998 | Sentilles et al. | 118/319 |
| 6,296,707 B1 | 10/2001 | Adamczyk et al. | |
| 2002/0144516 A1 * | 10/2002 | Mizuno | 65/17.3 |

FOREIGN PATENT DOCUMENTS

| | | |
|---|---|---|
| JP | 5-317797 A | 12/1993 |
| JP | 6-142594 A | 5/1994 |
| JP | 9-218303 A | 8/1997 |
| JP | 2000-334369 A | 12/2000 |
| JP | 2003-270505 A | 9/2003 |
| JP | 2003-290704 A | 10/2003 |
| JP | 2005-246266 A | 9/2005 |

* cited by examiner

*Primary Examiner* — Robert S Walters, Jr.
(74) *Attorney, Agent, or Firm* — Holtz Holtz Goodman & Chick PC (57) ABSTRACT

While one side of a lens L is held by a suction-holding member 17 and the suction-holding member 17 is moved by the moving mechanism, a coating process, a drying process, and a curing process are sequentially performed in respective receptacles disposed independently of each other. A suction force applied to the lens L by the suction-holding member 17 is controlled by a control section 22 in accordance with each of the receptacles in which the suction-holding member 17 is positioned.

12 Claims, 7 Drawing Sheets

LENS COATING APPARATUS AND LENS COATING METHOD

This application is a U.S. National Phase Application under 35 USC 371 of International Application PCT/JP2006/325579 filed Dec. 22, 2006.

TECHNICAL FIELD

The present invention relates to a lens coating apparatus and lens coating method for applying a coating liquid onto a lens, such as a plastic eyeglass lens, to form a coating film.

BACKGROUND ART

Plastic eyeglass lenses or the like are provided with various resin coatings formed on the front face or rear face thereof to ensure scratch resistance and/or to give various functions. Patent Document 1 discloses a method for forming a resin coating of this kind, in which a resin coating liquid is applied onto a substrate by spin-coating and is then dried.

In the technique disclosed in Jpn. Pat. Appln. KOKAI Publication No. 2003-290704, when a coating liquid is applied, a lens is gripped at the edge and rotated by a gripping and rotating member to perform a coating process. After a coating film is formed, the lens is detached from the gripping and rotating member, and then is subjected to a curing process.

However, according to this technique, where the gripping force is set at a level that provides a stable grip, the lens can be easily deformed during the coating process and so forth, thereby hindering formation of a uniform film. Further, after the coating process, the lens needs to be detached from the gripping and rotating member, so the operation is troublesome.

Jpn. Pat. Appln. KOKAI Publication No. 5-317797 discloses a technique, in which, while a disc-shaped substrate treated as a coating target object is held, a resin coating liquid is applied onto the substrate by spin-coating. Thereafter, the resin coating liquid is dried by blowing a warm gas and radiating ultraviolet rays thereon.

However, this technique is arranged to hold the coating target object by an opening formed at the center thereof, i.e., this technique is applicable only to a coating target object having an opening at the center, such as optical disc, and is not applicable to lenses. Further, a coating liquid nozzle, drying implement, rotating implement, curing implement, and so forth are present in one chamber, so the nozzle may be stopped due to scattering of the coating liquid and/or formation of a uniform coating film may be hindered due to deposition of the coating liquid on the drying implement and curing implement.

Another known apparatus includes a coating film forming implement, a drying implement, and a curing implement disposed in respective receptacles. According to this apparatus, a lens is held by suction and is sequentially transferred to the respective receptacles to continuously perform cleaning of the lens and coating and curing of a coating liquid.

However, this apparatus specifies nothing about a suction force for holding the lens, and thus cannot deny the possibility of relevant problems being caused, such as deformation of the lens. Further, this apparatus does not include a drying process independently performed, so a drying process is inevitably performed inside a container common to the coating process. In this case, foreign matters may be deposited on the lens due to drying, and/or the film thickness becomes less uniform due to a temperature change.

DISCLOSURE OF INVENTION

An object of the present invention is to provide a lens coating apparatus and lens coating method, which can control a suction force for holding a lens treated as a coating target object, so as to efficiently form a coating film without adversely affecting the lens.

According to the present invention, there is provided a lens coating apparatus comprising: a suction-holding member configured to hold a rear face or front face of a lens by suction; a coating film forming implement configured to apply a coating liquid onto the lens to form a coating film; a drying implement configured to dry the coating film; a curing implement configured to perform a curing process on the coating film; at least three receptacles disposed independently of each other and configured to accommodate the lens in performing respective processes by the coating film forming implement, the drying implement, and the curing implement; a moving implement configured to move the suction-holding member to place the lens held on the suction-holding member inside each of the receptacles; and a controller configured to control a suction force applied to the lens by the suction-holding member in accordance with each of the receptacles in which the suction-holding member is positioned.

In the lens coating apparatus, the coating film forming implement may comprise: a delivery implement configured to deliver the coating liquid onto a lens face opposite to a lens face at which the lens is held on the suction-holding member; and a rotary mechanism configured to rotate the suction-holding member on its own axis, while the delivery implement delivers the coating liquid, so as to form the coating film on a lens face.

The apparatus may be arranged such that the delivery implement comprises a nozzle configured to deliver the coating liquid and located below a lens face on which the coating film is to be formed, the suction-holding member is configured to hold the lens by suction with a coating target face thereof directed downward, and the nozzle is configured to delivery the coating liquid upward to form the coating film. In this case, the coating film forming implement is preferably configured to form the coating film by supplying a determined quantity of coating liquid from the nozzle while rotating the lens, which is held by suction on the suction-holding member, by the rotary mechanism.

The receptacle provided with the drying implement may have a cylindrical shape. The drying implement may comprise a drying nozzle directed upward from a bottom of the receptacle and a drying gas supply line connected to the drying nozzle.

The curing implement may comprise an ultraviolet radiation device configured to radiate ultraviolet rays onto the coating film to cure the coating film.

The apparatus may further comprise a cleaning implement configured to clean a lens face before forming the coating film, and a receptacle configured to accommodate the lens in performing a process by the cleaning implement. In this case, the coating film may comprise at least a first layer and a second layer applied on a lens face, such that the first layer is formed by processes sequentially performed by the cleaning implement, the coating film forming implement, the drying implement, and the curing implement, and then the second layer is formed by processes sequentially performed by the coating film forming implement, the drying implement, and the curing implement.

The receptacles are preferably arrayed in an annular direction. The apparatus may be arranged such that the number of suction-holding members is equal to or larger than the number of receptacles, and the moving implement comprises a rotary machine including a rotary shaft and a plurality of arms extending radially from the rotary shaft and respectively supporting the suction-holding members. The moving implement may further comprise an elevating mechanism configured to move the suction-holding members between a movable position above the receptacles and an accommodated position inside the receptacles.

According to a second aspect of the present invention, there is provided a lens coating method comprising: applying a coating liquid onto a lens, thereby forming a coating film; drying the coating film; and performing a curing process on the coating film, while holding the lens by suction on a suction-holding member, thereby coating a lens face with the coating film, wherein a suction force applied to the lens by the suction-holding member is controlled in accordance with each of the processes.

In the lens coating method, the suction force applied to the lens by the suction-holding member is preferably set to be higher in said forming a coating film than in said performing a curing process.

The method may further comprise cleaning a lens face before said forming a coating film. In this case, the suction force applied to the lens by the suction-holding member is preferably set to be higher in said cleaning a lens face and said forming a coating film than in said performing a curing process.

Said forming a coating film preferably comprises supplying a determined quantity of coating liquid onto the lens from below while rotating the lens on its own axis.

According to the present invention, a coating film forming implement configured to apply a coating liquid onto a lens to form a coating film, a drying implement configured to dry the coating film, and a curing implement configured to perform a curing process on the coating film are provided in respective receptacles independent of each other. The lens is held by suction on a suction-holding member and moved by a moving implement to the respective receptacles to sequentially perform these processes. At this time, a suction force applied to the lens by the suction-holding member is controlled in accordance with each of the receptacles in which the suction-holding member is positioned. Consequently, it is possible to form the coating film with high efficiency while preventing ill effects on the lens, such as deformation of the lens due to an excessively large suction force and contamination of the lens due to foreign matters.

BEST MODE FOR CARRYING OUT THE INVENTION

An embodiment of the present invention will now be described with reference to the accompanying drawings.

Figure 1A:
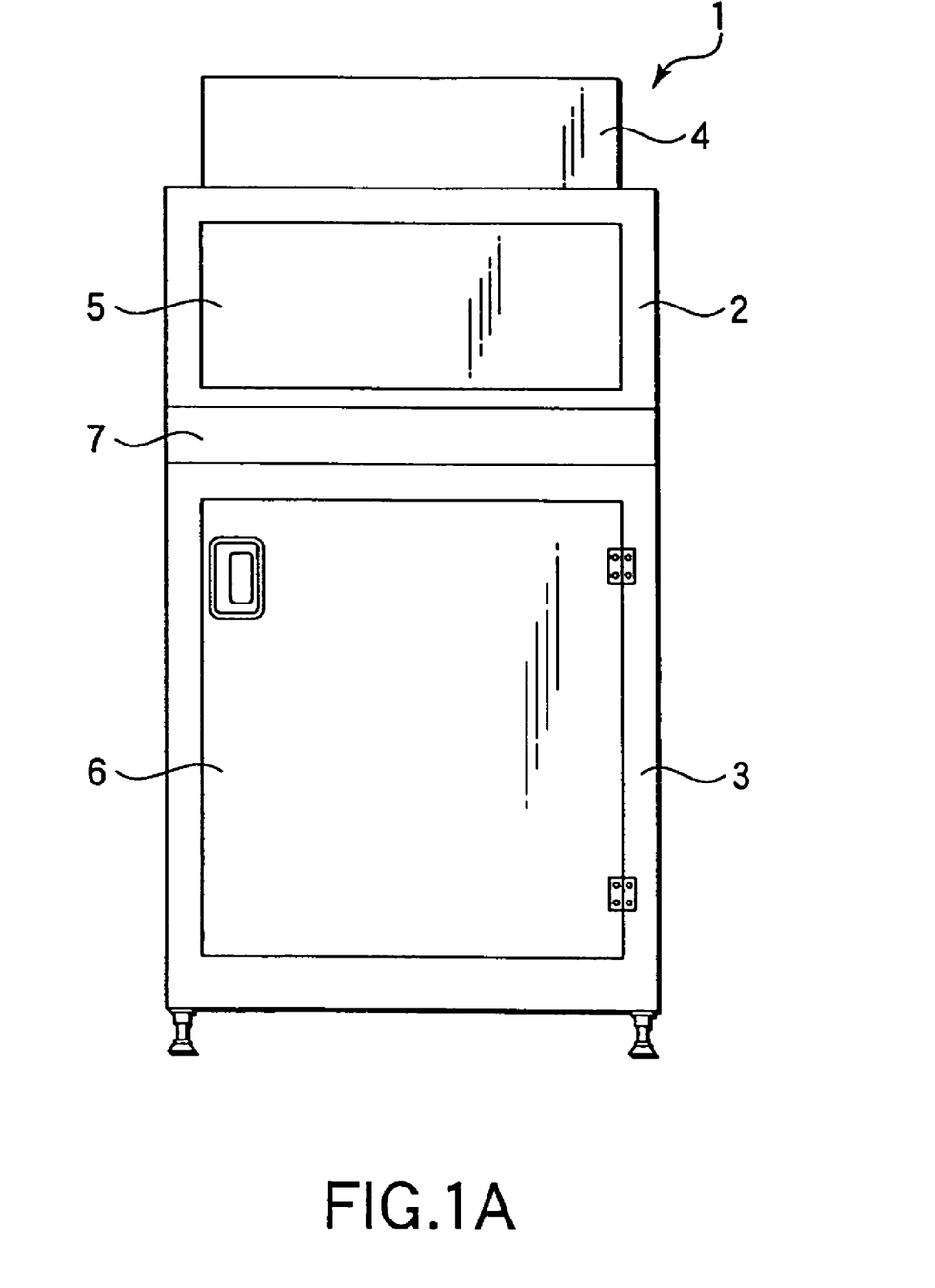
FIG. 1A This is a front view showing a lens coating apparatus according to an embodiment of the present invention.
Figure 1B:
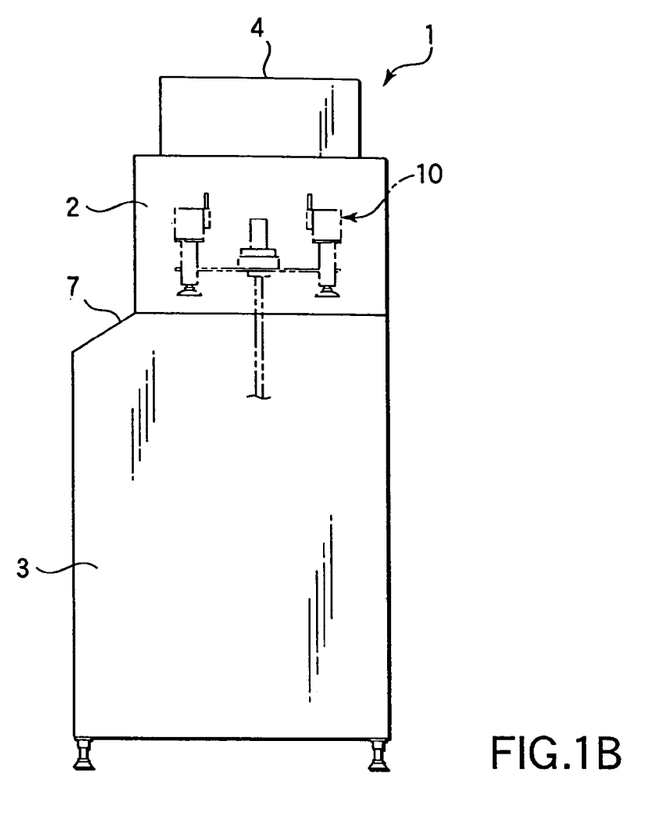
FIG. 1B This is a side view showing the lens coating apparatus according to the embodiment of the present invention.
Figure 2:
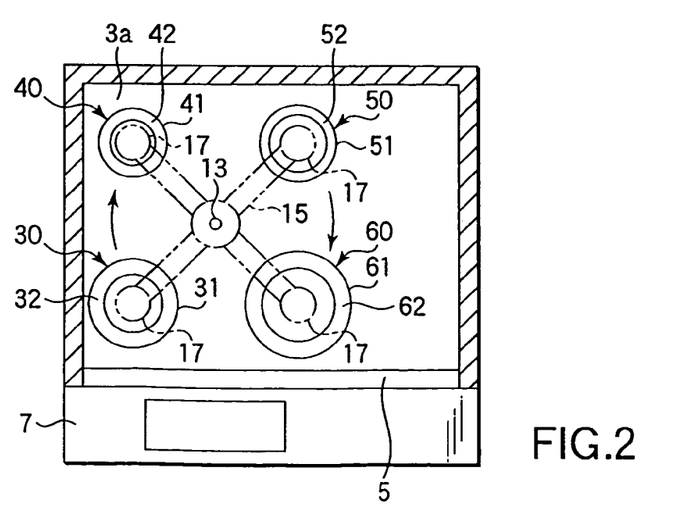
FIG. 2 This is a plan view showing the lens coating apparatus according to the embodiment of the present invention.

In this embodiment, an explanation will be given of a case where a lens to be processed is a plastic eyeglass lens. FIG. 1A is a front view showing a lens coating apparatus according to an embodiment of the present invention. FIG. 1B is a side view of the lens coating apparatus. FIG. 2 is a plan view of the lens coating apparatus. This coating apparatus 1 includes an I/O transfer section 2 for loading, unloading, and transferring eyeglass lenses treated as coating target objects. A process section 3 is disposed below the I/O transfer section 2 and is configured to perform a series of processes, as described later. A filter unit 4 is disposed on top of the I/O transfer section 2 and is configured to supply clean air into the I/O transfer section 2 and process section 3. The I/O transfer section 2 is provided with a transfer mechanism 10 disposed therein for transferring eyeglass lenses while holding them by suction. The I/O transfer section 2 has an opening portion 5 formed on the front side for loading and unloading eyeglass lenses treated as coating target objects. The process section 3 has a maintenance door 6. The process section 3 is provided with an operation panel 7 disposed on the upper front side for operating the coating apparatus 1.

As shown in FIG. 2, the process section 3 includes a cleaning unit 30 for cleaning eyeglass lenses, a coating unit 40 for applying a coating liquid onto eyeglass lenses to form a coating film, a drying unit 50 for drying the coating film by volatilizing the solvent of the applied coating liquid, and a curing unit 60 for curing the coating film. These processing units 30, 40, 50, and 60 include respective receptacles 31, 41, 51, and 61 independent of each other, wherein these receptacles 31, 41, 51, and 61 are arrayed in an annular direction. Further, these processing units 30, 40, 50, and 60 are respectively provided with a cleaning mechanism, coating film forming mechanism, drying mechanism, and curing mechanism disposed in the respective receptacles, so as to respectively perform a cleaning process, coating film forming process, drying process, and curing process on eyeglass lenses inside the receptacles 31, 41, 51, and 61. The receptacles 31, 41, 51, and 61 respectively have opening portions 32, 42, 52, and 62 formed at the top for inserting eyeglass lenses. Inside these receptacles, predetermined processes are respectively performed by the cleaning mechanism, coating film forming mechanism, drying mechanism, and curing mechanism. These opening portions 32, 42, 52, and 62 are formed in a partition plate 3a between the I/Q transfer section 2 and process section 3.

Figure 3:
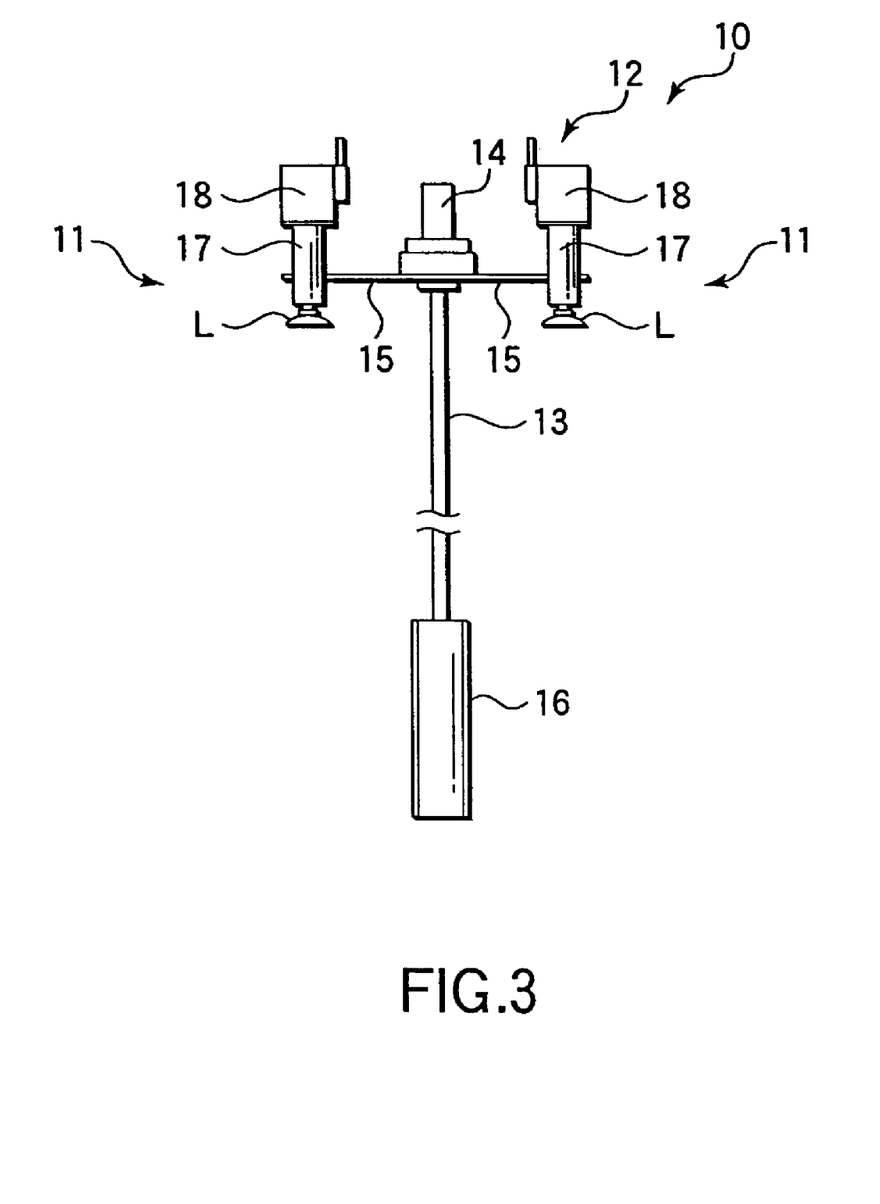
FIG. 3 This is a side view showing a transfer mechanism used in the lens coating apparatus according to the embodiment of the present invention.
Figure 4:
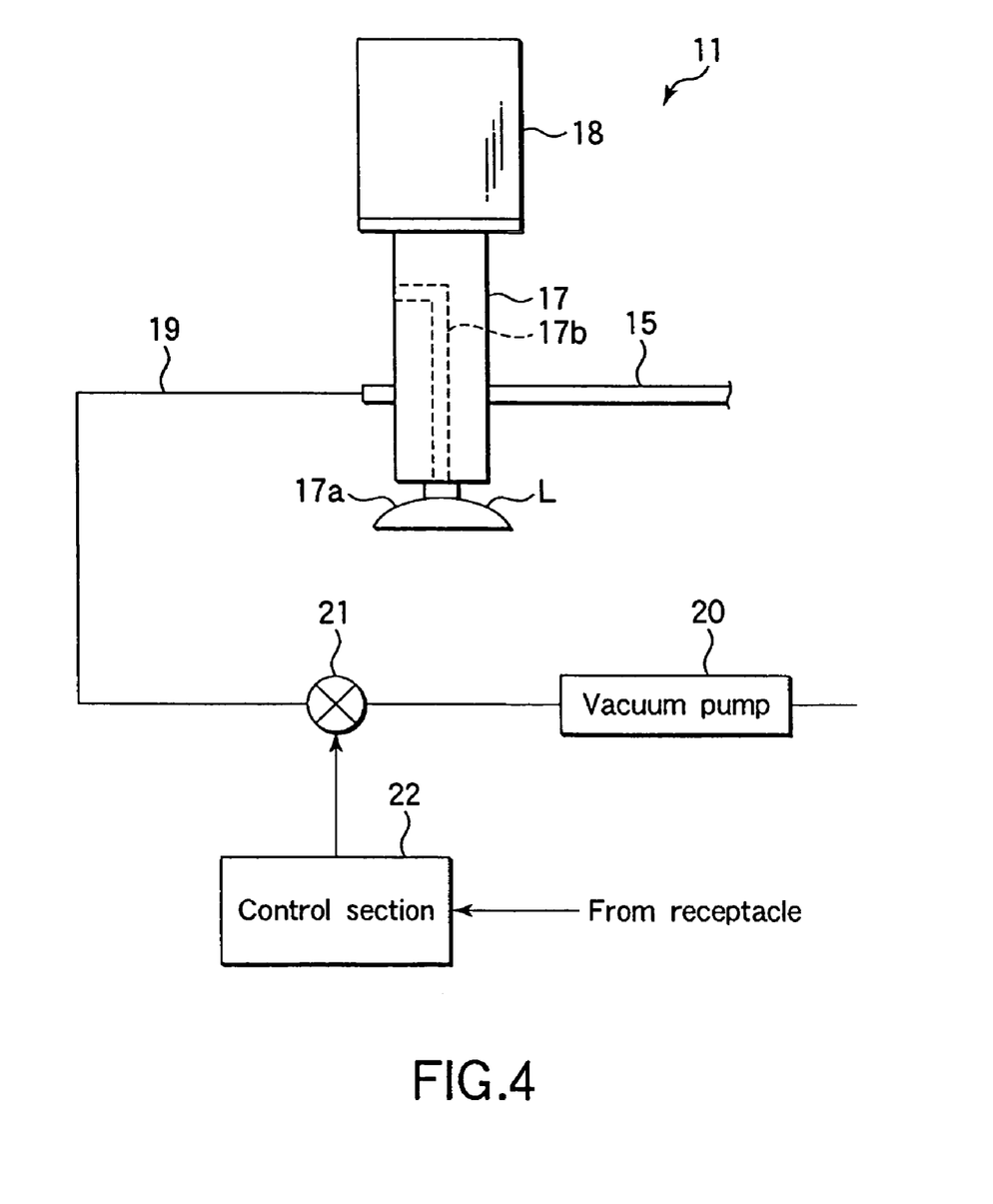
FIG. 4 This is a view showing a mechanism for controlling a suction force applied to an eyeglass lens in the lens coating apparatus according to the embodiment of the present invention.

As shown in FIG. 3, the transfer mechanism 10 includes four suction-holding devices 11 (only two of them are shown in FIG. 3) for holding eyeglass lenses L by suction, and a moving mechanism 12 for turning and thereby moving these suction-holding devices 11. The moving mechanism 12 includes a motor 14 used as a rotary machine and provided with a rotary shaft 13 extending in a vertical direction. From the top of the rotary shaft 13, four arms 15 (only two of them are shown in FIG. 3) extend crisscross in horizontal directions and respectively support the suction-holding devices 11 at the distal ends. An elevating mechanism 16 formed of, e.g., a cylinder mechanism is disposed to move the rotary shaft 13 up and down, so that eyeglass lenses L held by the suction-holding devices 11 are moved up and down between a transfer position above the process section 3 and a process position inside the respective receptacles. As also shown in FIG. 4, each of the suction-holding devices 11 includes a suction-holding member 17 having a suction port 17a formed at the bottom for holding a lens L by suction, and a rotary mechanism 18 for rotating the suction-holding member 17 and thereby rotating the eyeglass lens L on its own axis. The suction-holding member 17 is configured to hold the eyeglass lens L by vacuum suction, wherein the suction-holding member 17 includes an exhaust passage 17b communicating with the suction port 17a and connected to an exhaust line 19, as shown in FIG. 4. The exhaust line 19 is provided with a vacuum pump 20 for performing vacuum exhaust and a control valve 21 for controlling the vacuum exhaust amount. The control valve 21 is controlled by a control section 22. This control section 22 is preset to control the opening degree of the control valve 21, so as to control a suction force applied to the eyeglass lens L, in accordance with each of the receptacles in which this suction-holding member 17 is positioned. The control section 22 receives a signal when the suction-holding member 17 reaches a predetermined receptacle, and controls a suction force applied to the eyeglass lens L on the basis of the signal. Specifically, the suction force should be as small as possible for the curing process, because, if the suction force is too large, the lens substrate is deformed and hinders formation of a uniform film. On the other hand, the suction force should be larger to a certain extent for the cleaning process and coating process, because the eyeglass lens L is rotated. Accordingly, the suction force applied to the eyeglass lens L by the suction-holding member 17 during the cleaning process and coating process is preferably adjusted to be larger than the suction force used for the curing process. It is not so severe as the curing process, but the drying process may be adversely affected by deformation of the eyeglass lens L. Accordingly, the suction force applied to the eyeglass lens L by the suction-holding member 17 during the drying process is preferably adjusted to be smaller than the suction force used for the cleaning process and coating process. As described later, the control section 22 is preset to control the other components of the lens coating apparatus.

Next, an explanation will be given of the respective units.

Figure 5:
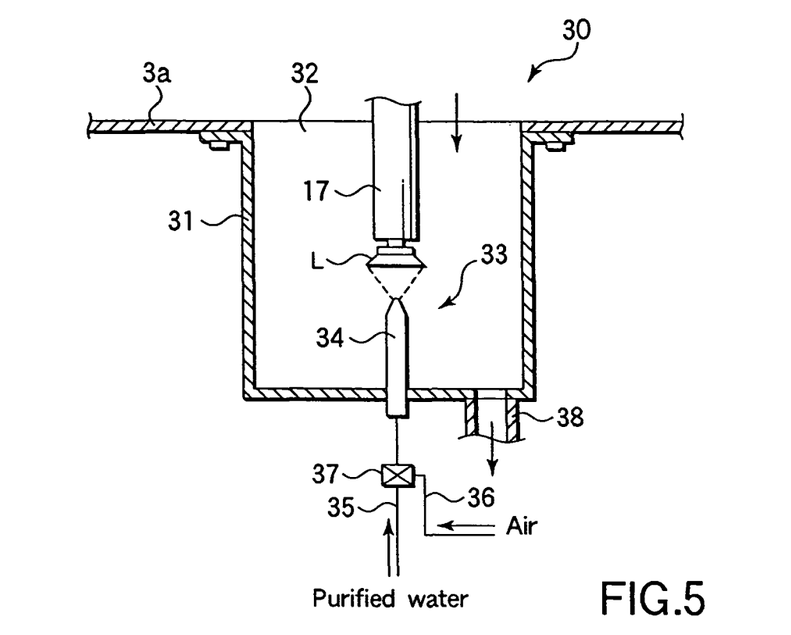
FIG. 5 This is a sectional view showing a cleaning unit used in the lens coating apparatus according to the embodiment of the present invention.

As shown in FIG. 5, the cleaning unit 30 includes a cylindrical receptacle 31 extending downward from the opening portion 32 formed in the partition plate 3a and a cleaning mechanism 33 disposed in the receptacle 31. The cleaning mechanism 33 includes a cleaning nozzle 34 configured to spray purified water and air used as a drying medium upward from below inside the receptacle 31. The cleaning nozzle 34 is connected to a purified water supply line 35 for supplying purified water and an air supply line 36 for supplying air, through a switching valve 37. After an eyeglass lens L is inserted through the opening portion 32, purified water is supplied from the cleaning nozzle 34 to clean the lower side of the eyeglass lens L, and then air is supplied to dry it. A drain port 38 is formed at the bottom of the receptacle 31. The cleaning nozzle 34 is formed of a full-cone spray nozzle to supply purified water and air all over the surface of the eyeglass lens L.

Figure 6:
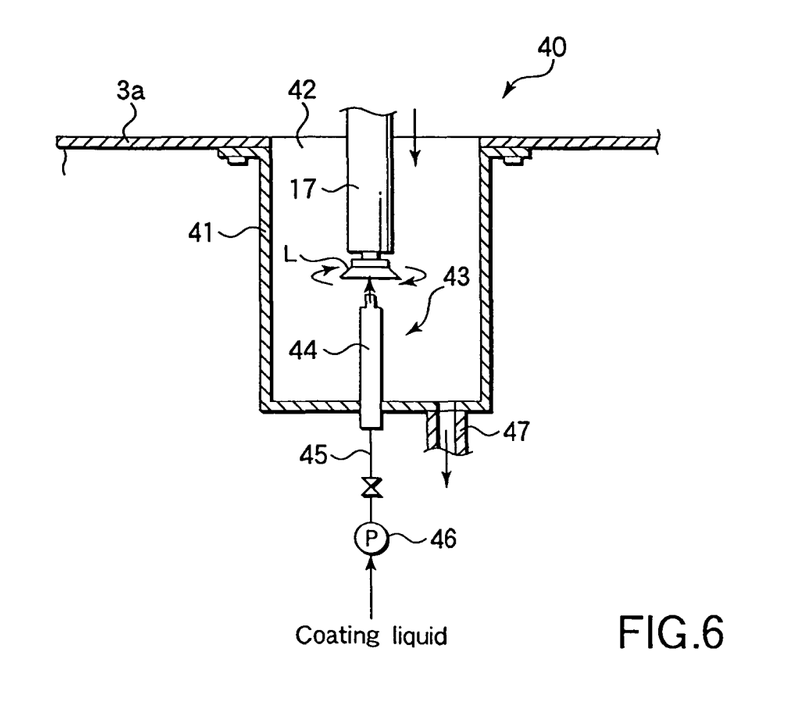
FIG. 6 This is a sectional view showing a coating unit used in the lens coating apparatus according to the embodiment of the present invention.

As shown in FIG. 6, the coating unit 40 includes a receptacle 41 extending downward from the opening portion 42 formed in the partition plate 3a and a coating film forming mechanism 43 disposed in the receptacle 41. The coating film forming mechanism 43 includes a coating liquid delivery nozzle 44 configured to deliver a coating liquid upward from below inside the receptacle 41. The coating liquid delivery nozzle 44 is connected to a coating liquid supply line 45 provided with a pump 46 configured to determine the quantity of coating liquid to be delivered onto the lens L. After an eyeglass lens L is inserted through the opening portion 42, a predetermined amount of coating liquid is supplied from the coating liquid delivery nozzle 44 onto the lower side of the eyeglass lens L, while the eyeglass lens L is rotated on its own axis by the rotary mechanism 18. Consequently, the coating liquid can be applied with high controllability to form a desired coating film on the eyeglass lens L. A drain port 47 is formed at the bottom of the receptacle 41.

Figure 7:
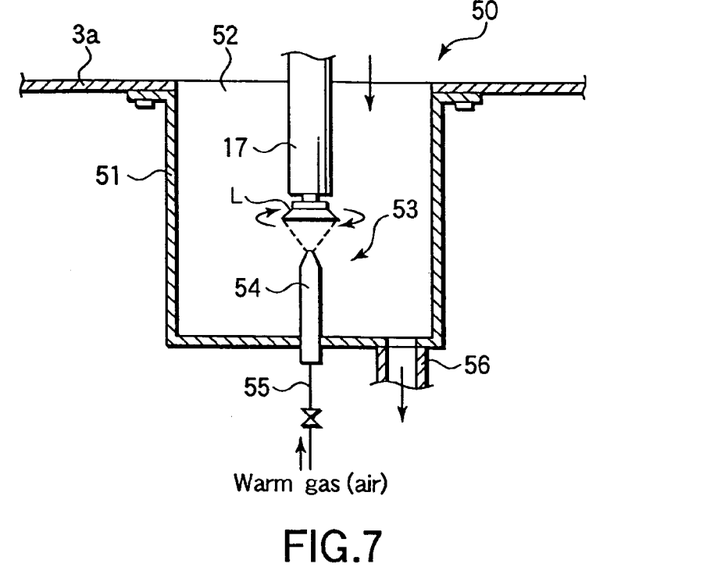
FIG. 7 This is a sectional view showing a drying unit used in the lens coating apparatus according to the embodiment of the present invention.

As shown in FIG. 7, the drying unit 50 includes a cylindrical receptacle 51 extending downward from the opening portion 52 formed in the partition plate 3a and a drying mechanism 53 disposed in the receptacle 51. The drying mechanism 53 includes a drying nozzle 54 configured to spray warm gas used as a drying medium upward from below inside the receptacle 51. The drying nozzle 54 is connected to an air supply line 55. After an eyeglass lens L is inserted through the opening portion 52, air is blown from the drying nozzle 54 through the air supply line 55 onto the lower side of the eyeglass lens L, while the eyeglass lens L is rotated on its own axis by the rotary mechanism 18. Consequently, the solvent of the coating liquid is volatilized and the coating film is thereby dried. A drain port 56 is formed at the bottom of the receptacle 51.

Figure 8:
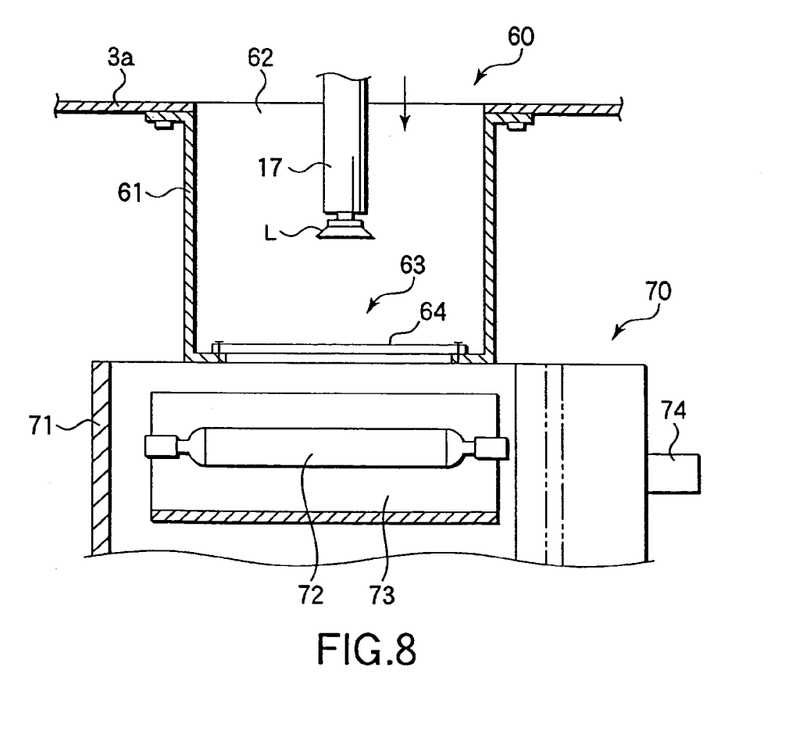
FIG. 8 This is a sectional view showing a curing unit used in the lens coating apparatus according to the embodiment of the present invention.

As shown in FIG. 8, the curing unit 60 includes a receptacle 61 extending downward from the opening portion 62 formed in the partition plate 3a and a curing mechanism 63 for performing a curing process on an eyeglass lens L accommodated in the receptacle 61. The curing mechanism 63 includes an ultraviolet radiation device 70 disposed below the receptacle 61 for radiating ultraviolet rays into the receptacle 61 and a heat ray cut filter 64 made of quartz glass or the like and detachably disposed between the receptacle 61 and ultraviolet radiation device 70. The ultraviolet radiation device 70 includes a casing 71, in which an ultraviolet lamp 72 is housed for radiating ultraviolet rays toward the receptacle 61 on the upper side. A reflection plate 73 is disposed to reflect ultraviolet rays radiated from the ultraviolet lamp 72 toward the receptacle 61. The reflection plate 73 also serves as a shutter, for which a shutter monitor 74 is disposed. After an eyeglass lens L is inserted through the opening portion 62, ultraviolet rays are radiated from the ultraviolet lamp 72 onto the lower side of the eyeglass lens L to cure the coating film.

Figure 9:
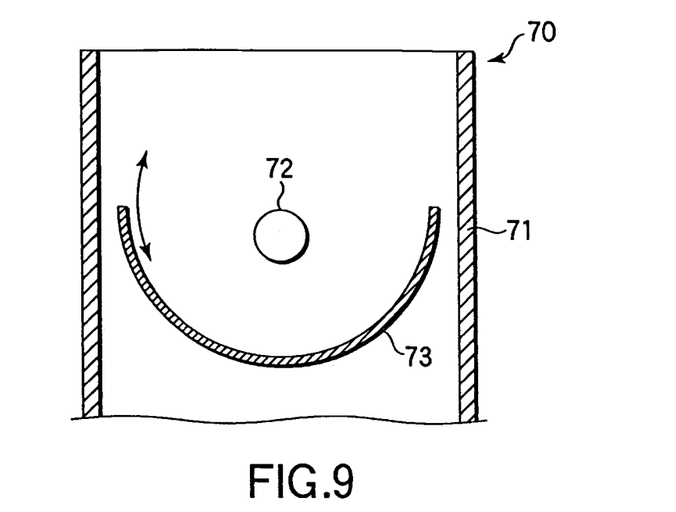
FIG. 9 This is a sectional side view showing the curing unit used in the lens coating apparatus according to the embodiment of the present invention.

As shown in the sectional side view of FIG. 9, the reflection plate 73 is formed of a semicircular cylindrical plate located below the ultraviolet lamp 72, so that ultraviolet rays radiated from the ultraviolet lamp 72 are reflected toward the receptacle 61. The reflection plate 73 is rotatable upward by an actuator (not shown), so that it can serve as a shutter.

The heat ray cut filter 64 is preferably used, but is not indispensable. However, if there is nothing between the receptacle 61 and ultraviolet lamp 72, the eyeglass lens L may fall onto the ultraviolet lamp 72 and damage the ultraviolet lamp 72. Accordingly, if the heat ray cut filter is omitted, an alternative member, such as a safety net, is preferably disposed.

Figure 10:
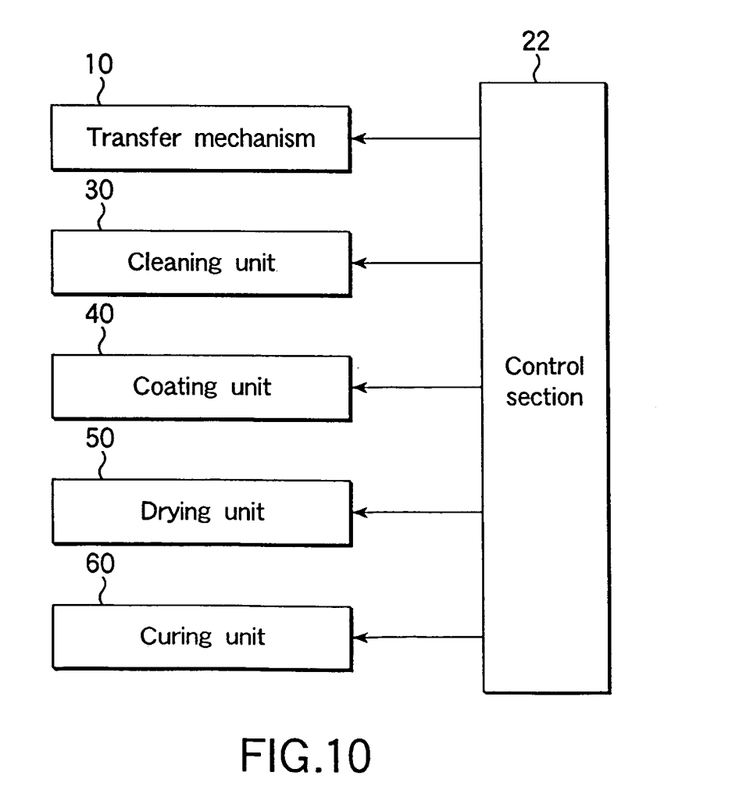
FIG. 10 This is a block diagram for explaining a control system used in the lens coating apparatus according to the embodiment of the present invention.

As shown in FIG. 10, the eyeglass lens coating apparatus 1 according to this embodiment is controlled by the control section 22 described above. Specifically, in addition to the control described above on the suction force of the suction-holding member 17 in the transfer mechanism 10, the control section 22 is preset to control the components of the transfer mechanism 10 other than the suction-holding member 17, and to control all the components of the cleaning unit 30, coating unit 40, drying unit 50, and curing unit 60.

Next, an explanation will be given of an operation of the coating apparatus 1 having a structure described above in forming a coating film on an eyeglass lens L.

At first, the suction-holding devices 11 of the transfer mechanism 10 are set at the upper position by the elevating mechanism 16, such that one of the suction-holding devices 11 is positioned directly above the cleaning unit 30. In this state, an eyeglass lens L is inserted by an operator through the opening portion 5 into the I/O transfer section 2, and the convex face of the lens L is held by suction on the suction port 17a at the bottom of the suction-holding member 17. Then, the suction-holding members 17 are moved down by the elevating mechanism 16, so that this lens L is inserted into the receptacle 31 of the cleaning unit 30. Then, purified water is supplied from the cleaning nozzle 34 of the cleaning mechanism 33 to clean the lens L. Then, the eyeglass lens L is rotated by the rotary mechanism 18 to throw off purified water, and then air is supplied to dry the lens L.

Thereafter, the suction-holding devices 11 of the transfer mechanism 10 are moved up by the elevating mechanism 16, and are turned by the motor 14 through the arms 15, so that the suction-holding member 17 that holds the eyeglass lens L treated by the cleaning process is positioned directly above the coating unit 40. At this time, a subsequent suction-holding member 17 is positioned directly above the cleaning unit 30. In this state, an eyeglass lens L is inserted by an operator through the opening portion 5 into the I/O transfer section 2, and the convex face of the lens L is held by suction on the suction port 17a at the bottom of this subsequent suction-holding member 17. Then, the suction-holding members 17 are moved down by the elevating mechanism 16, so that the first eyeglass lens L is inserted into the receptacle 41 of the coating unit 40 and the subsequent eyeglass lens L is inserted into the receptacle 31 of the cleaning unit 30. Then, the coating process and cleaning process are respectively performed on the lenses L by the coating film forming mechanism 43 and cleaning mechanism 33.

The first eyeglass lens L inserted in the receptacle 41 of the coating unit 40 is rotated on its own axis by the rotary mechanism 18, while a predetermined amount of coating liquid is delivered at a determined quantity from the coating liquid delivery nozzle 44 present on the lower side, so as to form a coating film. In this case, the eyeglass lens L is held by suction through its convex face positioned on the upper side, so the coating liquid does not cause drip-off or the like from the eyeglass lens L. Consequently, the coating film can be formed with high controllability for adjustment of the film thickness and so forth.

In order to form a coating film with high controllability, the viscosity of the coating liquid is preferably set to be 1 to 100 mPa·s. The viscosity can be controlled by adjusting the type of the coating liquid and/or the ratio between the solid content and solvent in the coating liquid. The ratio of the solid content in the coating liquid is preferably set to be about 10 to 100%.

The resin for constituting the coating liquid is only required to be cured by ultraviolet rays, and is exemplified by acrylic resins and urethane resins. The solvent is exemplified by esters, ethers, ketones, alcohols, aromatic hydrocarbons, and glycol ethers. In addition, the coating liquid may contain other adjustment components, such as antioxidant agent, anti-polymerization agent, leveling agent, moisture retaining agent, viscosity adjusting agent, antiseptic agent, antibacterial agent, ant-blocking agent, and ultraviolet absorbing agent.

The rotational speed of the eyeglass lens L in applying the coating liquid is preferably set to be 500 to 5,000 rpm, and more preferably to be 700 to 3,000 rpm.

The coating film thus formed is preferably set to have a film thickness of about 0.01 to 30 μm where a coating liquid, such as a hard coating liquid, is directly applied onto the eyeglass lens L. Further, the coating film may be formed to have a multi-layer structure, such that a primer is first applied and a hard coating is then applied. In this case, the primer is preferably set to have a film thickness of about 1 to 10 μm, and the hard coating is preferably set to have a film thickness of about 1 to 10 μm.

After the coating process described above is finished, the suction-holding devices 11 of the transfer mechanism 10 are moved up by the elevating mechanism 16, and are turned by the motor 14 through the arms 15, so that the suction-holding member 17 that holds the eyeglass lens L treated by the coating process is positioned directly above the drying unit 50. At this time, the subsequent suction-holding member 17 is positioned directly above the coating unit 40, and a further subsequent suction-holding member 17 is positioned directly above the cleaning unit 30. In this state, an eyeglass lens L is inserted by an operator through the opening portion 5 into the I/O transfer section 2, and the convex face of the lens L is held by suction on the suction port 17a at the bottom of this further subsequent suction-holding member 17. Then, the suction-holding members 17 are moved down by the elevating mechanism 16, so that the first eyeglass lens L is inserted into the receptacle 51 of the drying unit 50, the subsequent eyeglass lens L is inserted into the receptacle 41 of the coating unit 40, and the further subsequent eyeglass lens L is inserted into the receptacle 31 of the cleaning unit 30. Then, the drying process, coating process, and cleaning process are respectively performed on the lenses L.

In the drying unit 50, the first eyeglass lens L is inserted in the receptacle 51, and warm gas (air) is sprayed from the drying nozzle 54 present on the lower side onto the eyeglass lens L, so that the solvent of the coating liquid is volatilized and the coating film is thereby dried. In this case, the drying time is set to be a short time of about 10 seconds to 1 minute, because this process is used only for volatilizing the solvent.

After the drying process described above is finished, the suction-holding devices 11 of the transfer mechanism 10 are moved up by the elevating mechanism 16, and are turned by the motor 14 through the arms 15, so that the suction-holding member 17 that holds the eyeglass lens L treated by the drying process is positioned directly above the curing unit 60. At this time, the subsequent suction-holding member 17 is positioned directly above the drying unit 50, the further subsequent suction-holding member 17 is positioned directly above the coating unit 40, and a furthermore subsequent suction-holding member 17 is positioned directly above the cleaning unit 30. In this state, an eyeglass lens L is inserted by an operator through the opening portion 5 into the I/O transfer section 2, and the convex face of the lens L is held by suction on the suction port 17a at the bottom of this furthermore subsequent suction-holding member 17. Then, the suction-holding members 17 are moved down by the elevating mechanism 16, so that the first eyeglass lens L is inserted into the receptacle 61 of the curing unit 60, the subsequent eyeglass lens L is inserted into the receptacle 51 of the drying unit 50, the further subsequent eyeglass lens L is inserted into the receptacle 41 of the coating unit 40, and the furthermore subsequent eyeglass lens L is inserted into the receptacle 31 of the cleaning unit 30. Then, the curing process, drying process, coating process, and cleaning process are respectively performed on the lenses L.

In the curing unit 60, the first eyeglass lens L is inserted in the receptacle 61, and ultraviolet rays are radiated from the ultraviolet lamp 72 of the ultraviolet radiation device 70 onto the lens L to cure the coating film. In this case, the curing process can be performed in a short time of, e.g., about 1 to 10 seconds, because curing by use of ultraviolet rays provides a higher curing rate as compared to curing by use of heat.

After the curing process described above is finished, the suction-holding devices 11 of the transfer mechanism 10 are moved up by the elevating mechanism 16, and the eyeglass lens L treated by the process in the curing unit 60 is detached from the corresponding suction-holding member 17 and is unloaded through the opening portion 5 by an operator. Consequently, a series of processes are completed on the first eyeglass lens L. Then, the suction-holding devices 11 are turned by the motor 14 through the arms 15, so that the suction-holding member 17 from which the eyeglass lens L has been detached is positioned directly above the cleaning unit 30. In this state, an eyeglass lens L is inserted by an operator through the opening portion 5 into the I/O transfer section 2, and the convex face of the lens L is held by suction on the suction port 17a at the bottom of this suction-holding member 17. In this way, the same processes are repeated.

As described above, eyeglass lenses Ls treated as coating target objects are continuously transferred to the cleaning unit 30, coating unit 40, drying unit 50, and curing unit 60 to perform the processes thereon in forming a coating film, so the coating film is formed with high efficiency. In addition, the respective processes are performed in the receptacles independent of each other, so the possibility of foreign matters mixing into the coating film becomes lower. The curing process using ultraviolet rays can complete curing in a short time, and the drying process performed prior to the curing process is used only for volatilizing the solvent and thus requires a short time, so the coating film can be formed in a short time. Further, the cleaning process is performed by the cleaning unit 30 before the coating process, so the coating process can be performed with a high yield.

As described above, the cleaning process, coating process, drying process, and curing process are continuously performed as a series of processes. In this case, since the necessary suction force and acceptable suction force differ depending on the processes, the suction force applied to the eyeglass lens L by the suction-holding member 17 is controlled by the control section 22 in accordance with the receptacle (i.e., processing unit) in which the suction-holding member 17 is positioned. Consequently, the processes for coating can be performed on the eyeglass lens L by use of suction forces optimum to the respective processes, thereby preventing accidents, such as slip-off of the eyeglass lens L, as well as problems, such as a deterioration of the uniformity of the coating film.

Specifically, the suction force should be set relatively large for the cleaning process and coating process, because these processes are arranged to rotate the eyeglass lens L at a relatively high speed and thus entail a high risk of the eyeglass lens L slipping off, but these processes can be less adversely affected by deformation of the eyeglass lens due to a large suction force. For example, the vacuum suction force is set to be about 0.5 to 0.9 atm pressure. On the other hand, the suction force should be as small as possible for the curing process, because, if the suction force is too large, the lens substrate is deformed and hinders formation of a uniform film. Accordingly, the suction force applied to the eyeglass lens L during the curing process is set to be smaller than that used for the cleaning process and coating process. For example, the vacuum suction force is set to be about 0.1 to 0.7 atm pressure. Further, it is not so severe as the curing process, but the drying process may be adversely affected by deformation of the eyeglass lens L. Accordingly, the suction force applied to the eyeglass lens L by the suction-holding member 17 during the drying process is preferably adjusted to be smaller than the suction force used for the cleaning process and coating process.

Where the suction force applied to the eyeglass lens L is controlled as described above, a coating film of high quality can be formed with a high yield.

It should be noted that, where the coating film is formed to have a multi-layer structure, such that a primer is first applied onto the eyeglass lens L and a hard coating is then applied, as described above, the cleaning process needs to be performed only before the first coating film is formed. Accordingly, when the first layer is applied onto the eyeglass lens L, the transfer mechanism 10 is controlled by the control section 22 to sequentially and continuously transfer the eyeglass lens L to the cleaning unit 30, coating unit 40, drying unit 50, and curing unit 60. Then, where the second layer or a further subsequent layer is applied onto the first layer, the transfer mechanism 10 is controlled by the control section 22 to sequentially and continuously transfer the eyeglass lens L to the coating unit 40, drying unit 50, and curing unit 60. Consequently, the coating film having a multi-layer can be efficiently formed.

The present invention is not limited to the embodiment described above, and it may be modified in various manners. For example, in the embodiment described above, the drying process and curing process are performed in different units after the coating process, but the curing unit may be provided with a drying nozzle to perform the drying process and curing process in the same unit without transferring the coating target object. Further, in the embodiment described above, the cleaning unit is arranged to perform cleaning and then drying in the same unit, but the drying after the cleaning may be performed in another unit. Alternatively, a series of processes may be started from the coating process while omitting the cleaning process. Further, in the embodiment described above, the curing process is arranged to use radiation of ultraviolet rays, but this process may be arranged to use other radiation rays, such as electron rays, in place of ultraviolet rays. Alternatively, the curing process may be performed by use of heat. The coating film is not necessarily required to be completely cured, and it may be stopped at a pre-cured stage. Even in this case, there is no problem in handing the target object. Further, in the embodiment described above, the number of suction-holding devices is set the same as the number of receptacles, but the number of suction-holding devices may be set larger. Further, in the embodiment described above, the upper side of an eyeglass lens is held by suction, and the coating liquid is applied from below to form a coating film. Alternatively, the lower side of an eyeglass lens may be held by suction, so that the coating liquid is applied to the upper side. Furthermore, the embodiment described above is exemplified by a case where a coating film is formed on an eyeglass lens, but the coating film may be formed on another lens.

INDUSTRIAL APPLICABILITY

The present invention can be utilized for forming resin coatings on lenses, such as eyeglass lenses, to ensure scratch resistance and/or to give various functions.

The invention claimed is:

1. A lens coating method comprising:
holding a lens by suction to face downward on a suction-holding member configured to rotate on its own axis and to travel with the lens held thereon;
then placing the lens facing downward into a coating receptacle by causing the suction-holding member to travel with the lens held thereon, and applying a coating liquid onto the lens from below, thereby forming a coating film;
then placing the lens facing downward into a drying receptacle by causing the suction-holding member to travel with the lens held thereon, and drying the coating film by performing drying of the lens; and
then placing the lens facing downward into a curing receptacle by causing the suction-holding member to travel with the lens held thereon, and performing a curing process on the coating film by supplying radiation rays or heat to the lens,
wherein:
the applying the coating liquid is performed while the suction-holding member is caused to hold the lens with a coating suction force and to rotate the lens about the axis,
the curing process is performed while the suction-holding member is caused to hold the lens with a curing suction force without rotating the lens about the axis, and
the coating suction force is higher than the curing suction force.

2. The lens coating method according to claim 1, wherein, before placing the lens facing downward into the coating receptacle, the method further comprises placing the lens facing downward into a cleaning receptacle by causing the suction-holding member to travel with the lens held thereon, and cleaning the lens by supplying purified water to the lens from below.

3. The lens coating method according to claim 2, wherein cleaning the lens includes causing the suction-holding member to hold the lens with a cleaning suction force and to rotate the lens about the axis to throw off the purified water at least after finishing supply of the purified water to the lens, and
wherein the cleaning suction force is higher than the curing suction force.

4. The lens coating method according to claim 2, wherein the method further comprises revolving the suction-holding member about a rotary shaft located outside the suction-holding member such that the suction-holding member travels to the cleaning receptacle, the coating receptacle, the drying receptacle, and the curing receptacle, in this order, with the lens held on the suction-holding member so as to face downward.

5. The lens coating method according to claim 1, wherein drying the coating film is performed while causing the suction-holding member to hold the lens with a drying suction force, and the drying suction force is lower than the coating suction force.

6. The lens coating method according to claim 5, wherein drying the coating film is performed while causing the suction-holding member to rotate the lens about the axis.

7. The lens coating method according to claim 1, wherein a control section is configured to cause the suction-holding member to control a suction force to the lens, and the method further comprises:
receiving signals by the control section when the suction-holding member reaches the coating receptacle and the drying receptacle, respectively, and
controlling the suction-holding member by the control section to set the coating suction force and a drying suction force, respectively.

8. The lens coating method according to claim 1, wherein the coating suction force is a vacuum suction force of 0.5 to 0.9 atm pressure, and the curing suction force is a vacuum suction force of 0.1 to 0.7 atm pressure.

9. The lens coating method according to claim 1, wherein applying the coating liquid is performed while causing the suction holding member to rotate the lens about the axis at 700 to 3,000 rpm.

10. The lens coating method according to claim 1, wherein the coating liquid contains one of an acrylic resin and urethane resin, and wherein the curing process is performed by radiating ultraviolet rays as the radiation rays to the lens from below.

11. The lens coating method according to claim 10, wherein the coating film has a thickness of 0.01 to 30 µm, and the curing process is performed for 1 to 10 seconds.

12. The lens coating method according to claim 1, wherein the method further comprises revolving the suction-holding member such that the suction-holding member travels to the coating receptacle, the drying receptacle, and the curing receptacle, in this order, with the lens being held on the suction-holding member so as to face downward.

* * * * *